United States Patent Office 3,657,387
Patented Apr. 18, 1972

3,657,387
POLYESTER RESIN COMPOSITION WITH A LONG SHELF LIFE
Eldon E. Stahly, Ellicott City, and Edwin W. Lard, Bowie, Md., assignors to W. R. Grace & Co., New York, N.Y.
No Drawing. Continuation-in-part of application Ser. No. 782,735, Dec. 10, 1968. This application Apr. 29, 1970, Ser. No. 33,047
Int. Cl. C08f 21/02, 45/58
U.S. Cl. 260—866     10 Claims

ABSTRACT OF THE DISCLOSURE

Uncured, curable, unsaturated polyester resin compositions consisting essentially of an unsaturated polyester, an ethylenically unsaturated monomer such as styrene or a similar monomer, and about 0.1–1.5 mole percent of an inhibitor selected from a group consisting of tetrachlorocatechol, tetrachlorohydroquinone, tetrabromocatechol, and tetrabromohydroquinone have shelf lives in excess of about 100 days at about 70° C.

CROSS REFERENCE TO RELATED APPLICATION

This is a continuation-in-part of our copending application Ser. No. 782,735, filed Dec. 10, 1968, and now abandoned.

BACKGROUND OF THE INVENTION

The invention described and claimed herein was made in the course of or under a contract or subcontract thereunder with the Department of the Air Force, Department of Defense.

This invention is in the field of stabilized, uncured polyester resin compositions which are liquids at room temperature (e.g., ca. 15–35° C.). More particularly, this invention is in the field of stabilized, uncured, curable, burn resistant, unsaturated polyester resin compositions, said compositions comprising about 10–45% (or about 20–40%) by weight of monomeric styrene (or similar ethylenically unsaturated monomer), about 0.25–6.4% by weight percent (ca. 0.1–1.5 mole percent, as hereinafter defined) of an inhibitor selected from a group consisting of tetrachlorcatechol, tetrachlorohydroquinone, tetrabromocatechol, and tetrabromohydroquinone, and enough uncured, unsaturated polyester to total 100%, said compositions being a liquid at room temperature and having a shelf life (gel time) in excess of about 100 days at about 70° C. and in excess of about 25,000 days at about 25° C.

Although an extended shelf life at elevated temperature (e.g., a gel time in excess of about 20–30 days at 70° C.) is generally unnecessary in the uncured, curable, burn resistant, unsaturated polyester resin compositions used commercially in North America and Europe, the extended shelf life of the polyester resin compositions of this invention is especially valuable in relatively undeveloped tropical and desert areas since polyester resin compositions shipped to such areas can be stored for several weeks on open docks, in fields, or in sheds (which lack air conditioning facilities) under conditions such that the temperature may reach about 50–65° C. The compositions of this invention are especially useful for constructing quick-curing pads for use as runways for light aircraft and for constructing quick curing slabs to support houses, office buildings, storage sheds, and the like in primitive areas.

U.S. Pat. 2,779,701 (Robitschek et al., 154/43) teaches (lines 49–51 of column 14) that polymerization inhibitors (stabilizers) usually constitute about 0.001–1% by weight of flame-retardant polyester compositions. U.S. Pat. 3,288,735 (Watanabe et al., 260/17.4) presents a list of inhibitors including hydroquinone, trinitrophenol, 4-ethylcatechol, 3-phenylcatechol, and 3-isobutylcatechol which have been used to increase the gel time (shelf life) of unsaturated polyester resin compositions.

Stabilized, uncured, curable, burn resistant, unsaturated, liquid (at room temperature) polyester composition comprising about 10–45% by weight of monomeric styrene (or similar ethylenically unsaturated monomer) and about 0.001–1% by weight of inhibitor and enough uncured, curable, unsaturated polyester to total 100%, are well known in the art. However, the prior art compositions differ from the compositions of this invention in; (a) the nature (chemical identity) of stabilizer (inhibitor or gel retarder) present; and (b) shelf life (gel time)—the gel time of the prior art resins being about 15–50 days (or in some instances less) at about 70° C.

SUMMARY OF THE INVENTION

In summary, this invention is directed to a stabilized, uncured, curable, burn resistant, unsaturated polyester resin composition consisting essentially of:

(a) An unsaturated polyester of; (i) a polyhydric alcohol selected from a first group consisting of ethylene glycol, diethylene glycol, propylene glycol, and a polyethylene glycol having a molecular weight between 300 and 4000; (ii) a member selected from a second group consisting of chlorendic acid and chlorendic anhydride; (iii) a member selected from a third group consisting of maleic acid, fumaric acid, itaconic acid, and aconitic acid or an anhydride of the third group member; and (iv) a member selected from a fourth group consisting of tricarballyic acid, citric acid, succinic acid, adipic acid, sebacic acid, azelaic acid, phthalic acid, and terephthalic acid or an anhydride of the fourth group member, the chlorine content of the stabilized polyester resin composition being 20 to 30%, the mole ratio of the third group member to the fourth group member being 1:0.25–12;

(b) An ethylenically unsaturated monomer selected from a fifth group consisting of styrene, vinyl toluene, α-methylstyrene, dimethylstyrene, the methyl - α - methylstyrenes, α-bromostyrene, β-bromostyrene, α-chlorostyrene, β-chlorostyrene, diallylphthalate, vinyl acetate, methyl methacrylate, and divinylbenzene, the fifth group member constituting about 10–45% (preferably about 20–40%) of the stabilized, uncured, curable, burn resistant, unsaturated polyester resin composition; and (c) An inhibitor selected from a sixth group consisting of tetrabromocatechol, tetrachlorocatechol, tetrabromohydroquinone, and tetrachlorohydroquinone, the sixth group member being present in an amount between about 0.1 and about 1.5 mole percent based on the stabilized, uncured, curable, burn resistant, unsaturated polyester resin composition, said composition having a gel time of at least about 100 days at 70° C.

DESCRIPTION OF PREFERRED EMBODIMENTS

In a preferred embodiment ("Embodiment A") of the composition described in the above summary the second group member is tetrabromophthalic acid or tetrabromophthalic anhydride (rather than chlorendic acid or chlorendic anhydride) and the composition has a bromine content of about 5–12% (rather than a chlorine content of about 20–30%).

In other preferred embodiments of the compositions of; (a) the above Summary; or (b) Embodiment A, supra:

(1) The sixth group member is present in an amount between about 0.25 and about 1 mole percent based on the stabilized, uncured, curable, burn resistant, unsaturated polyester resin composition;

(2) About 0.03–0.5 mole percent of cobalt, calculated as Co, is present in the stabilized, uncured, curable, burn resistant, unsaturated polyester resin composition, the cobalt being added as a soluble cobalt salt or as an adduct of such cobalt salt and a member selected from the sixth group, the mole ratio of cobalt:sixth group member in said adduct being about 1:1;

(3) A member selected from a seventh group consisting of tertiary butylcatechol and methylhydroquinone is present, the seventh group member being present in an amount between about 0.1 and about 1 mole percent based on the stabilized, uncured, curable, burn resistant, unsaturated polyester resin composition; and (4) The fifth group member is styrene.

DETAILED DESCRIPTION OF THE INVENTION

It is an object of this invention to provide a stabilized, uncured, curable, burn resistant, unsaturated polyester resin composition having a shelf life of at least about 100 days at about 70° C. It is another object to provide several new and novel inhibitors excellently adapted for accomplishing the aforesaid object. Other objects of the invention will be readily apparent to those skilled in the art.

The aforesaid objects have been accomplished by incorporating such quantity of at least one additive selected from a group consisting of tetrachlorocatechol, tetrachlorohydroquinone, tetrabromocatechol, and tetrabromohydroquinone into an uncured, curable, burn resistant, unsaturated polyester resin composition that the inhibitor content of the resulting stabilized polyester resin composition will fall within a range of about 0.1–1.5 (or 0.25–1 or 0.5–0.8) mole percent.

In general, unsaturated polyester resins are prepared by the esterification of alpha- beta-unsaturated polybasic acids, and dihydric alcohols. Certain compounds of this type can be indicated generically as follows;

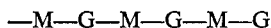

where, —M— represents an unsaturated dibasic acid moiety and —G— represents a dihydric alcohol moiety. Modifying dibasic acids may also be used in the polyester resin compositions. Representative dihydric alcohol and unsaturated polybasic acids are shown below.

In preparing unsaturated polyesters which can be employed in the practice of the present invention, the alcohol component may comprise ethylene glycol, diethylene glycol or propylene glycol, or one of the group of solid polyethylene glycols designated as "Carbowax."

Polyethylene glycols such as the "Carbowaxes" are understood to have molecular weights above 300. Those most useful for this invention have weights below 4000 and preferably are in a range of about 1000 to 2000, e.g., 1500.

The acid component usually comprises an alpha- beta-ethylenically unsaturated polycarboxylic acid such as maleic, fumaric or itaconic acid, or the well-known derivatives of these polycarboxylic acids having ethylenic unsaturatation in alpha-beta-relation to a carboxyl group. Polybasic acids such as aconitic acid, tricarballylic acid or citric acid may also be employed. A plurality of such acids also may be mixed with each other, if so desired. In many instances, it may be desirable to include a dicarboxylic acid free of ethylenic unsaturation. Examples of this latter type of dicarboxylic acid include phthalic acid or terephthalic acid, which, although they contain double bonds in the benzene ring, do not undergo addition reaction with monomer compounds and may, therefore, be considered as being the equivalent of saturated compounds. Likewise, aliphatic dicarboxylic acids such as succinic acid, adipic acid, sebacic acid, or azelaic acid may be substituted for a part of the alpha- beta-ethylenically unsaturated dicarboxylic acid. The proportion of the non-ethylene acid with respect to the alpha- beta-ethylenically unsaturated acid is susceptible of wide variation. Halogen-containing (generally saturated) acids are included to render the cured polymers made by copolymerizing the polyester with styrene (or the like) burn resistant. These halogen-containing acids are generally added in such quantity that the uncured polyester compositions formed by admixing the polyester with styrene (or a similar ethylenically unsaturated monomer) contain about 5–12% bromine or about 20–30% chlorine. A molecular proportion of 0.25 to 12 moles of saturated acid per mole of unsaturated acid is usually used for commercial applications. Also, acid anhydrides of these dicarboxylic acids can be used instead of the dicarboxylic acids.

In preparing the polyester, a small excess (e.g., ca. 5–10%) of the dihydric alcohol is sometimes employed. The conditions of the esterification reaction are those conventionally employed in preparing polyesters. For example, the mixture of the alcohol and the acid is heated in a vented container or under an inert atmosphere until the water of reaction is expelled from the system, which usually occurs in a temperature range of about 150° to 210° C. The reaction is continued until the acid value is reduced to a reasonable low point, e.g., within a range of about 5 to 50, or until the mixture becomes highly viscous or even solid when it is cooled. Usually, these conditions are attained in a period of 2 to 20 hours. In any event, the reaction is concluded before the product becomes infusible and insoluble because of the advanced stage of polymerization. The product is then blended with the ethylenically unsaturated monomer in such a manner as to maintain the temperature of the blend below about 65° C.

The preferred ethylenically unsaturated monomers for use in preparing the compositions of this invention are liquid compounds in which the polyester component is soluble. These monomers contain the >C=CH$_2$ group—preferably with said group attached to a negative radical such as a benzene ring, a chlorine atom, an ester linkage, a nitrile group, or the like. These ethylenically unsaturated monomers are free of carbon-carbon conjugated double bonds. While many monomers which can be used in the composition of our invention will be readily apparent to those skilled in the art, we prefer to use a members selected from a group consisting of styrene, vinyl toluene, α-methylstyrene, dimethylstyrene, the methyl-α-methylstyrenes, α-bromostyrene, β-bromostyrene, α-chlorostyrene, β-chlorostyrene, diallylphthalate, vinyl acetate, methyl methacrylate, and divinylbenzene.

In general, the ratio of ethylenically usaturated monomer component (or components where using at least two such monomers) to the polyester component can vary over a relatively broad range, but, usually, the amount of such monomer is less (on a weight basis) than the amount of the polyester component. Usually, the percentage of said monomer will fall within a range of about 10 to 45 precent by weight of the total mixture of polyester and monomer, and the preferred range of said monomer is, in most instances, about 20 to 40 percent.

The polyester resin compositions of this invention contain about 20–30% chlorine or about 5–12% bromine and are "burn resistant" i.e., upon curing (crosslinking between the polyester component and the ethylenically unsaturated monomer (e.g., styrene) component of the composition they form copolymers which are very resistant to burning because of their substantial halogen content). The polyesters used in preparing the polyester compositions of this invention are prepared by esterifying mixtures of dibasic acids and/or anhydrides with a difunctional glycol. Part of the acid moieties are unsaturated, and the final polyester is diluted with styrene or the like. The resin for end-use applications is cured with a peroxide catalyst in the presence of a cobalt or similar (e.g., vanadium, iron, or the like) promoter to develop the final crosslinked three dimensional thermoset copolymer product.

The curing time of the polyester resin systems varies between about 1 minute and about 24 hours. This time span depends, in part, upon such variables as type of polyester resin, amount of catalyst, and amount of inhibitor. The curing temperature of the polyester resin systems varies between about 15° C. and about 250° C. Preferably, the polyester resin systems are cured at room temperature (15° to 35° C.).

As the scope of useful polyester resin systems is extensive, the type of promoter which can be used in those systems is also extensive. A few exemplary promoters are given in the following paragraphs.

One of the promoter types which can be used in the polyester resin systems is a cobalt salt which is capable of being dissolved in the resinous composition. U.S. Pat. No. 3,288,735, teaches the use of cobalt salts, e.g., cobalt naphthenate, to decrease the gelation time of polyester resin compositions comprising a polyester resin having alpha- beta-unsaturation, a monomer having an unsaturated bond, and certain inhibitors. Other cobalt salts excellently adapted for use in promoters in the compositions of this invention are cobalt octoate or any other higher fatty acid salt of cobalt. The amount of cobalt salt can be varied from about 0.001 to 0.3 percent of the salt calculated as dissolved metallic cobalt based on the total weight of the composition. On the same basis, the preferred amount of cobalt metal generally ranges from about 0.05 to 0.15 percent.

Vanadium promoters disclosed in U.S. Pat. No. 3,333,021 are useful. Other promoters, including iron, are well known to those skilled in the art.

The promoter can be admixed with the polyester composition before the composition is placed in storage or it (the promoter) can be admixed with the composition at any time before curing the composition.

The polyester resin systems of this invention can also contain other compatible additives, such as fillers (silica, talc, mica, clay, carbon black, etc.), dyes, reinforcing materials (asbestos, chopped glass fibers), etc.

The resin systems stabilized with agents of this invention are readily curable, for example, when excess peroxide catalysts and cobalt promoter are employed to destroy, neutralize, or inactivate the inhibitors. The preferred catalysts are disclosed in copending application Ser. No. 782,734 (Disclosure No. 2693); filed Dec. 10, 1968; D. A. Daniels, R. L. Orem, and E. W. Lard, Applicants. For example, the preferred catalysts for curing the resin systems include a ketone peroxide, such as Lupersol 224, Lupersol DDM, methylethyl ketone peroxides, and the like, and an organic nonketonic diperoxide, such as Lupersol 256. The amount of each preferred catalyst component must be based on the amount of each stabilizer present. In general, the non-ketonic diperoxide can be present in an amount between about 2 to about 3 percent by weight based upon the resin composition (polyester plus monomers, etc.) present and the ketone peroxide can be present in an amount between about 2 to about 6 percent by weight based upon the amount of resin components. The amount of cobalt promoter present is preferably between about 0.2 to about 0.4 mole percent based on the resin composition.

The instant invention will be better understood by referring to the following specific but nonlimiting examples. It is understood that said invention is not limited by these examples which are offered merely as illustrations; it is also understood that modifications can be made without departing from the spirit and scope of the invention.

EXAMPLES.—PREPARATION OF RESINS

Example 1

Polyester composition A was prepared by admixing and heating (as hereinbefore described) 10 moles of diethylene glycol, 4 moles of maleic anhydride, 5 moles of chlorendic anhydride, 1 mole of adipic acid, 10 moles of styrene, and about 0.02 mole of cobalt octoate. There was a total halogen content of about 25 percent.

Example 2

Polyester composition B was prepared by admixing and heating (as hereinbefore described) 10 moles of diethylene glycol, 5 moles of maleic anhydride, 5 moles of chlorendic anhydride, and 10 moles of styrene. There was a total halogen content of about 25 percent. (A cobalt compound, or other catalyst, must be placed in the composition before it can be cured after storage.)

Example 3

Polyester composition C was prepared by admixing and heating (as hereinbefore described) 10 moles of diethylene glycol, 5 moles of maleic anhydride, 5 moles of chlorendic anhydride, 10 moles of styrene, and about 0.02 mole of cobalt octoate. There was a total halogen content of about 25 percent.

Example 4

Polyester composition D was prepared by admixing and heating (as hereinbefore described) 10 moles of diethyl glycol, 6.2 moles of maleic anhydride, 1.2 moles of tetrabromophthalic anhydride, 2.6 moles of phthalic anhydride and 10 moles of styrene. There was a total halogen content of about 9 to about 11 percent. (A cobalt compound, or other catalyst, must be placed in the composition before it can be cured after storage.)

Example 5

Polyester composition E was prepared by admixing and heating (as hereinbefore described) 10 moles of diethyl glycol, 6.2 moles of maleic anhydride, 1.2 moles of tetrabromophthalic anhydride, 2.6 moles of phthalic anhydride, 10 moles of styrene, and about 0.02 mole of cobalt octoate. There was a total halogen content of about 9 to about 11 percent.

DETERMINATION OF GEL TIME

Example 6

We determined the gel time (shelf life) of our polyester resin compositions (with and without the addition of inhibitors) by using the following procedure which is based upon a procedure published by Cass and Burnett (Ind. Eng. Chem., 1954, 46, 1619–1624).

A sample of polyester resin composition was placed in a test tube having a diameter of about ½ inch and a height of about 4 inches. Sufficient sample was added to fill the tube within about an inch of its top, and a cork stopper was inserted tightly into the top of the tube—leaving an air column (bubble) about ½ inch in height between the top of the sample and the bottom of the stopper. The stoppered tube was immediately placed in an oven at a preselected temperature and examined from time to time by inverting it (the tube) and noting whether or not the air bubbles would rise when the tube was inverted. The gel point was taken as the point at which the bubble ceased to rise when the tube was inverted. Gel time (at the preselected temperature) was the time (hours or days at said temperature) required for the sample to reach its gel point. Precision (reproducibility) between runs, as determined by making a number of runs in duplicate or triplicate, was found to be about ±5–10%.

Since shelf life (gel time) determination on the stabilized polyester resin compositions of this invention would be both tedious and of an impractically long duration if made at 70° C. (because these compositions have gel times in excess of 100 days at 70° C., the actual determinations were made using 125° C. as the abovementioned "preselected temperature." The thus obtained gel times ("gel times at 125° C.") were adjusted to gel times at 70° C. by using an Arrhenius type relationship set forth in the equation $k=Ae^{-E/RT}$, which reduces to log $$k = C_1 - \frac{E}{2.303RT_1}$$

where $k$=rate of crosslinking of the resin at temperature $T$ (° K.), $E$=energy of activation in cal./mole, $R$=1.987 cal.; and $C_1$ is a constant equal to log A, the frequency factor or collision frequency. The rates of crosslinking (i.e., gelling) of polyester resin formulations of Examples 1 through 5 when plotted on semi-log paper (log $k$ vs. $1/T$ (° K.)) each fall on a straight line for the temperature range 70–150° C. This straight line relationship establishes the fact that the mechanism of the gelling reaction does not change over the temperature range of interest, and the slope of the line=$-E/2.303R$, and E, the activation energy of the gelation, can be calculated for each resin.

It is possible to simplify the extrapolation of shelf life of a resin composition to a temperature other than that at which it was determined by using a procedure which bypasses calculation of the reaction rate. The change in viscosity which occurs upon aging results from crosslinking and conversion of the fluid polyester into a non-flowable gel; this change is substantially constant for each particular polyester formulation. Therefore, the rate of crosslinking expressed in terms of rate of change of viscosity (i.e., $\Delta$viscosity/time) becomes $C_2$/time where $C_2$ is a constant. Hence, when log $1/t$ (where $t$ is time, in days, in which gelation occurs) is plotted against $1/T$ (° K.), a line is obtained having a slope identical with that of the line represented by a plot of $1/T$ (° K.) vs. log $k$.

It is convenient to plot the colog of $1/t$ (or log $t$ itself) vs. $1/T$ (° K.) to obtain a line of the same slope but of opposite sign. The straight line obtained by plotting log $t$ vs. $1/T$ (° K.) can be extrapolated to any $1/T$ value required within a range of about 273–445° K. thus permititng accelerated storage tests based on this use of higher test temperatures. This permits a rapid laboratory determination of whether or not an inhibitor prevents "setting" (gelation) of a polyester resin composition prior to combination with a catalyst curing system for an end use application.

The following table (Table I) shows the results of 4 tests of gel time made with polyester resin composition B (a control and 3 runs with inhibitors) at 125° C. and these gel times adjusted to 70° C.

TABLE I

Gel time, polyester resin composition B

| Gel time at 125° C., days: | Corresponding gel time at 70° C., days |
|---|---|
| 0.3 [1] | 9 |
| 2 [2] | 120 |
| 10 [2] | 700 |
| 99 [2] | 4,500 |

[1] Control, no inhibitor present.
[2] Inhibitor present.

The following table (Table II) presents a summary of the results obtained in a series of runs using; (a) no inhibitor; (b) some conventional inhibitors; (c) the inhibitors of this invention; (d) conventional inhibitors plus a cobalt promoter; and (f) inhibitors of this invention plus a cobalt promoter. These results show the superiority of the inhibitors of this invention over conventional inhibitors. Said results also show that the point presence of a cobalt promoter and an inhibitor of the instant invention in a polyester resin composition produces a greater increase in shelf life (gel time) at 70° C. than the same inhibitor without the cobalt promoter although the cobalt promoter without the inhibitor does not increase gel time. These results show that a cobalt promoter does not produce a similar beneficial effect where used in combination with a conventional inhibitor.

TABLE II.—GEL TIME, DAYS AT 70° C.

| Additive | Polyester[1] comp. A | Polyester comp. B | Polyester[1] comp. C | Polyester comp. D | Polyester[1] comp. E |
|---|---|---|---|---|---|
| None | | 9 | | 10 | |
| 0.05 mole percent cobalt octoate | 9 | | 8 | | 10 |
| 1 mole percent hydroquinone [2] | | 50 | | 35 | |
| 1 mole percent hydroquinone [2] <br> 0.05 mole percent cobalt octoate | 22 | | 30 | | 25 |
| 0.5 mole percent tetrafluorocatechol [2] <br> 0.05 mole percent cobalt octoate | | | | 35 | |
| 1 mole percent 3,4,6-tribromocathechol [2] <br> 0.05 mole percent cobalt octoate | 30 | | | | |
| 1 mole percent methylhydroquinone [2] | | | | 42 | |
| 1 mole percent methylhydroquinone [2] <br> 0.05 mole percent cobalt octate | 52 | | 20 | | 13 |
| 1 mole percent tertiary butylcatechol [2] | | 35 | | 30 | |
| 1 mole percent tertiary butylcatechol [2] <br> 0.05 mole percent cobalt octooate | 12 | | 11 | | 10 |
| 1 mole percent tetrabromocatechol [3] | | 120 | | | |
| 1 mole percent tetrabromocatechol [3] <br> 0.05 mole percent cobalt octoate | 4,600 | | | | |
| 1 mole percent tetrabromocatechol [3] <br> 0.2 mole percent cobalt octoate | 4,600 | 4,500 | | | |
| 0.5 mole percent tetrabromocatechol [3] <br> 0.05 mole percent cobalt octoate | | | | 100 | |
| 0.25 mole percent tetrabromocatechol [3] <br> 0.25 mole percent cobalt [4,5] | | 4,500 | | 600 | 120 |
| 0.5 mole percent tetrabromocatechol [3] <br> 0.25 mole percent cobalt [5] | 10,000 | | 10,000 | | |

See footnotes at end of table.

TABLE II.—Continued

| Additive | Polyester[1] comp. A | Polyester comp. B | Polyester[1] comp. C | Polyester comp. D | Polyester[1] comp. E |
|---|---|---|---|---|---|
| 0.2 mole percent tetrabromocatechol[3] | | | | | |
| 0.8 mole percent methylhydroquinone[2] | 10,000 | | | | |
| 0.05 mole percent cobalt octoate | | | | | |
| 0.25 mole percent tetrabromohydroquinone[3] | | 700 | | | |
| 0.25 mole percent tertiary butylcatechol[2] | | | | | |
| 1.25 mole percent tetrachlorocatechol[3] | | | | 110 | |
| 0.5 mole percent tetrachlorocatechol[3] | | 100 | | | |
| 0.25 mole percent tetrachlorocatechol[3] | | 600 | | 600 | |
| 0.25 mole percent cobalt[6,8] | | | | | |
| 1 mole percent tetrachlorohydroquinone[3] | | 250 | | | |
| 0.25 mole percent tetrachlorohydroquinone[3] | | 600 | 600 | | |
| 0.25 mole percent cobalt[7,8] | | | | | |
| 1 mole percent tetrachlorohydroquinone[3] | | | 190 | | |
| 0.05 mole percent cobalt octoate | | | | | |

[1] In the instances of polyester resin compositions "A", "C," and "E," the cobalt in the list of additives includes the 0.05 mole percent of cobalt added as cobalt octoate where preparing the respective resin compositions. (See Examples 1, 3, and 5, supra).
[2] Inhibitor of the prior art.
[3] Inhibitor of the instant invention.
[4] Cobalt naphthenate was admixed and reacted with tetrabromocatechol in diethyl phthalate and maintained at about 135° C. for an hour. The resulting product was found to be an adduct of cobalt naphthenate and tetrabromocatechol, the mole ratio of cobalt:tetrabromocatechol being about 1:1. A mixture (50% adduct and 50% diethyl phthalate) was added to the polyester resin composition in such quantity as to provide 0.25 mole percent tetrabromocatechol and 0.25 mole percent cobalt (as Co) based on the weight of the polyester resin composition.
[5] After admixing sufficient cobalt naphthenate with the polyester resin composition to bring the total cobalt content thereof to about 0.25 mole percent, sufficient tetrabromocatechol was admixed with the resin composition to bring the tetrabromocatechol content thereof to about 0.5 mole percent.
[6] Cobalt naphthenate was admixed and reacted with tetrachlorocatechol in diethyl phthalate and maintained at about 135° C. for an hour. The resulting product was found to be an adduct of cobalt naphthenate and tetrachlorocatechol, the mole ratio of cobalt:tetrachlorocatechol being about 1:1. A mixture (50% adduct and 50% diethyl phthalate) was added to the polyester resin composition in such quantity as to provide 0.25 mole percent tetrachlorocatechol and 0.25 mole percent cobalt (as Co) based on the weight of the polyester resin composition.
[7] After admixing sufficient cobalt naphthenate with the polyester resin composition to bring the total cobalt content thereof to about 0.25 mole percent, sufficient tetrachlorohydroquinone was admixed with the resin composition to bring the tetrachlorohydroquinone content thereof to about 0.25 mole percent.
[8] Other runs (not included in Table II) were made with excellent results using cobalt adducts prepared by reacting cobalt naphthenate or cobalt octoate with tetrachlorocatechol, tetrabromohydroquinone, tetrabromocatechol, or tetrabromohydroquinone in xylene, or a pyridylpropanol.

CURING THE STABILIZED POLYESTER RESIN COMPOSITION

Example 7

A portion of polyester resin composition C which had been stabilized with about 1 mole percent tetrabromocatechol was admixed with Lupersol 224 and Lupersol 256 (these Lupersols are peroxide catalysts, i.e., polymerization initiators). These materials were admixed in the following proportions; (a) 93.6% stabilized (inhibited) polyester resin composition; (b) 3.7% Lupersol 224; and (c) 2.7% Lupersol 256. The resulting mixture was cured by heating to a temperature between 25° C. and 82° C. for 25 minutes. The curing reaction was exothermic and autoaccelerative. The resin system gelled after 20 minutes and the peak temperature was about 120° C. A well-cured polyester resin was obtained. After 24 hours, the flexural modulus was 200,000 pounds per square inch (p.s.i.).

Example 8

Example 7 was repeated, except that polyester resin composition B was used (the inhibitor was tetrabromocatechol), and 0.02 mole percent of cobalt octoate was admixed before curing. A well-cured polyester resin was obtained with a flexural modulus of 250,000 p.s.i. after 24 hours.

Example 9

An uncured polyester resin system, containing 18.1 weight percent fiber glass, 3.7 weight percent 3,5-dimethyl-3,5-dihydroxy-1,2-peroxycyclopentane solution (30 parts dissolved in 70 parts of propylene glycol), 2.7 weight percent Lupersol 256, and 74.0 weight percent of the polyester resin composition A (which was stabilized with 1 mole percent tetrabromocatechol), and sufficient additional cobalt octoate to make 100% was prepared. The aforesaid system was then cured by heating to about 40–80° C. The flexural modulus of the cured material, after 24 hours was 410,000 p.s.i.

Example 10

Example 9 was repeated, except that the solvent in the 1,2-peroxycyclopentane solution was hexylene glycol. A well cured resin was obtained.

Example 11

Example 9 was repeated, except that the solvent in the 1,2-peroxycyclopentane solution was a 50/50 mixture of water and hexylene glycol. A well-cured resin was obtained.

Example 12

Example 9 was repeated, except that the 1,2-peroxycyclopentane was replaced with:

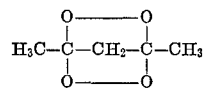

A well-cured resin was obtained.

As used herein the term "percent (%)," unless otherwise defined where used, means parts per hundred by weight.

As used herein the term "mole percent (mole percent)" means one mole in 10,000 grams of resin composition (i.e., one centimole (0.01 mole) per hundred grams of resin composition. Thus, to prepare a resin composition containing 1 mole percent of tetrabromocatechol one would admix 1 mole (ca. 426 grams) of tetrabromocatechol with enough resin composition (ca. 9,574 grams) to produce 10,000 grams of inhibited resin composition.

As used herein the term "mole" has its generally accepted meaning; i.e., a mole of a substance is that quantity of said substance which contains the same number of molecules of said substance as there are carbon atoms in exactly 12 grams of pure [12]C.

As used herein the term "stabilized, uncured, curable, burn resistant, unsaturated polyester resin composition" means an unsaturated polyester which; (a) has been admixed with styrene or a similar ethylenically unsaturated monomer to form a composition which may or may not contain a cobalt or similar accelerator; (b) has been stabilized (had its gel time extended to at least 100 days at 70° C.) by admixing with a sufficient quantity of at least one of the inhibitors (stabilizers) recited in the above Summary to make the total inhibitor content of the composition about 0.1–1.5 mole percent; (c) has not been cured (i.e., has not been gelled, or polymerized by crosslinking with the styrene or the like) present therein; and (d) can be cured by treating with a suitable peroxide catalyst (in the presence of a cobalt or other promoter) to yield a burn resistant crosslinked copolymer with styrene (or similar ethylenically unsaturated monomer present in the uncured composition). It will be obvious to those skilled in the art that the uncured composition of this invention will burn where the ethylenically unsaturated monomer present therein is styrene or a similar inflammable substance. In other words, the term "burn resistant" as used in this specification means that the composition, which may be quite inflammable per se, will, upon curing, yield a burn resistant copolymer.

As used herein the term "inhibitor" (or "stabilizer") means a substance or mixture of substances which will extend the gel time or shelf life (i.e., will retard or prevent the polymerization or crosslinking during storage) of the unsaturated polyester and styrene (or other ethylenically unsaturated monomer) which comprise a polyester composition.

As used herein the term "a soluble cobalt salt" means a cobalt salt which is soluble in a polyester resin composition such as those described in Examples 1–5, supra.

As used herein the expression "° K." means temperature in degrees Kelvin (i.e., absolute temperature).

Lupersol DDM is a solution comprising 60% methyl ethyl ketone peroxides and hydroperoxides in dimethyl phthalate. Lupersol 224 is a solution comprising 30% 3,5-dimethyl-3,5-dihydroxy-1,2-peroxycyclopentane in triethyl phosphate. Lupersol 256 is a difunctional polyester catalyst designed especially for elevated temperature applications comprising at least 90% 2,5-dimethyl-2,5-bis(2-ethyl hexanoylperoxy)hexane and having at least 6.69% available oxygen.

Burn resistant polymers or copolymers are also called "fire retardant" polymers or copolymers.

We claim:
1. A stabilized uncured, curable, burn resistant, unsaturated polyester resin composition consisting essentially of;
  (a) an unsaturated polyester of; (i) a polyhydric alcohol selected from a first group consisting of ethylene glycol, diethylene glycol, propylene glycol, and a polyethylene glycol having a molecular weight between 300 and 4000; (ii) a member selected from a second group consisting of chlorendic acid and chlorendic anhydride; (iii) a member selected from a third group consisting of maleic acid, fumaric acid, itaconic acid, and aconitic acid or an anhydride of the third group member; and (iv) a member selected from a fourth group consisting of tricarballyic acid, citric acid, succinic acid, adipic acid, sebacic acid, azelaic acid, phthalic acid, and terephthalic acid or an anhydride of the fourth group member, the chlorine content of the stabilized polyester resin composition being 20 to 30%, the mole ratio of the third group member to the fourth group member being 1:0.25–12;
  (b) an ethylenically unsaturated monomer selected from a fifth group consisting of styrene, vinyl toluene, α-methylstyrene, dimethylstyrene, the methyl-α-methylstyrenes, α-bromostyrene, β-bromostyrene, α-chlorostyrene, β-chlorostyrene, diallylphthalate, vinyl acetate, methyl methacrylate, and divinylbenzene, the fifth group member constituting about 10–45% of the stabilized, uncured, curable, burn resistant, unsaturated polyester resin composition; and
  (c) an inhibitor selected from a sixth group consisting of tetrabromocatechol, tetrachlorocatechol, tetrabromohydroquinone, and tetrachlorohydroquinone, the sixth group member being present in an amount between about 0.1 and about 1.5 mole percent based on the stabilized, uncured, curable, burn resistant, unsaturated polyester resin composition, said composition having a gel time of at least about 100 days at 70° C.

2. The composition of claim 1 in which the sixth group member is present in an amount between about 0.25 and about 1 mole percent based on the stabilized, uncured, curable, burn resistant, unsaturated polyester resin composition.

3. The composition of claim 1 in which about 0.03–0.5 mole percent of cobalt, calculated as Co, is present in the stabilized, uncured, curable, burn resistant, unsaturated polyester resin composition, the cobalt being added as a soluble cobalt salt or as an adduct of such cobalt salt and a member selected from the sixth group, the mole ratio of cobalt:sixth group member in said adduct being about 1:1.

4. The composition of claim 1 in which a member selected from a seventh group consisting of tertiary butylcatechol and methylhydroquinone is present, the seventh group member being present in an amount between about 0.1 and about 1 mole percent based on the stabilized, uncured, curable, burn resistant, unsaturated polyester resin composition.

5. The composition of claim 1 in which the fifth group member is styrene.

6. A stabilized uncured, curable, burn resistant, unsaturated polyester resin composition consisting essentially of;
  (a) an unsaturated polyester of; (i) a polyhydric alcohol selected from a first group consisting of ethylene glycol, diethylene glycol, propylene glycol, and a polyethylene glycol having a molecular weight between 300 and 4000; (ii) a member selected from a second group consisting of tetrabromophthalic acid and tetrabromophthalic anhydride; (iii) a member selected from a third group consisting of maleic acid, fumaric acid, itaconic acid, and aconitic acid or an anhydride of the third group member; and (iv) a member selected from a fourth group consisting of tricarballyic acid, citric acid, succinic acid, adipic acid, sebacic acid, azelaic acid, phthalic acid, and terephthalic acid or an anhydride of the fourth group member, the bromine content of said composition being about 5–12%, the mole ratio of the third group member to the fourth group member being 1:0.25–12;
  (b) an ethylenically unsaturated monomer selected from a fifth group consisting of styrene, vinyl toluene, α-methylstyrene, dimethylstyrene, the methyl-α-methylstyrene, α-bromostyrene, β-bromostyrene, α-chlorostyrene, β-chlorostyrene, diallylphthalate, vinyl acetate, methyl methacrylate, and divinylbenzene, the fifth group member constituting about 10–45% of the stabilized, uncured, curable, burn resistant, unsaturated polyester resin composition; and
  (c) an inhibitor selected from a sixth group consisting of tetrabromocatechol, tetrachlorocatechol, tetrabromohydroquinone, and tetrachlorohydroquinone, the sixth group member being present in an amount between about 0.1 and about 1.5 mole precent based on the stabilized, uncured, curable, burn resistant, unsaturated polyester resin composition, said composition having a gel time of at least about 100 days at 70° C.

7. The composition of claim 6 in which the sixth group member is present in an amount between about 0.25 and about 1 mole percent based on the stabilized, uncured, curable, burn resistant, unsaturated polyester resin composition.

8. The composition of claim 6 in which about 0.03–0.5 mole percent of cobalt, calculated as Co, is present in the stabilized, uncured, curable, burn resistant, unsaturated polyester resin composition, the cobalt being added as a soluble cobalt salt or as an adduct of such cobalt salt and a member selected from the sixth group, the mole ratio of cobalt:sixth group member in said adduct being about 1:1.

9. The composition of claim 6 in which a member selected from a seventh group consisting of teriary butylcatechol and methylhydroquinone is present, the seventh group member being present in an amount between about 0.1 and about 1 mole percent based on the stabilized, uncured, curable, burn resistant, unsaturated polyester resin composition.

10. The composition of claim 6 in which the fifth group member is styrene.

References Cited

UNITED STATES PATENTS

| | | | |
|---|---|---|---|
| 2,610,168 | 9/1952 | Anderson | 260—864 |
| 2,779,701 | 1/1957 | Robitschek et al. | 260—864 |
| 3,216,969 | 10/1961 | Cyba | 260—45.75 |
| 3,288,735 | 11/1966 | Watanabe et al. | 260—17.4 |
| 3,336,416 | 8/1967 | Eimers et al. | 260—864 |
| 3,341,492 | 9/1967 | Champ et al. | 260—45.95 |
| 3,377,407 | 4/1968 | Kressin et al. | 260—863 |

OTHER REFERENCES

Bjocksten; Polyesters and Their Applications; (1956) pp. 52 and 53.

Mieziva; "The Effect of Inhibitor Structure on Unsaturated Polyester Resins," Kunststoffe 56(a) 1966, pp. 619–625.

WILLIAM H. SHORT, Primary Examiner

R. J. KOCH, Assistant Examiner

U.S. Cl. X.R.

260—23 P, 40 R, 45.8, 45.9, 45.95, 863, 864, 869